United States Patent Office 3,004,075
Patented Oct. 10, 1961

3,004,075
PURIFICATION OF FLUOROCARBONS
Kalman Marcali, Wilmington, Del., assignor to E. I. du Pont de Nemours and Company, Wilmington, Del., a corporation of Delaware
No Drawing. Filed Sept. 17, 1959, Ser. No. 840,535
15 Claims. (Cl. 260—648)

This invention relates to the purification of saturated fluorocarbons and particularly to a process for decreasing the amounts of those impurities which are obtained as by-products or as unconverted reactants in the preparation of the saturated fluorocarbons.

The saturated fluorocarbons in the pure state are highly inert, odorless, tasteless and nontoxic gases or liquids at atmospheric pressure and the usual prevailing room temperatures. They are stable to quite high temperatures and to hydrolysis and are inert to acids, alkalis and most reactive chemicals. They are well known to be useful as dielectrics, solvents, heat exchange media and hydraulic liquids. The lower boiling members, boiling below normal atmospheric temperatures, are also well known to be useful as refrigerants and as propellants for a wide variety of materials, that is, as liquified gases under pressure having dissolved or dispersed therein materials which are to be expelled from containers as sprays or aerosols. Particularly because of their stability, inertness and nontoxicity, the lower boiling members are well adapted for use as propellants for food formulations.

Some of the saturated fluorocarbons, such as octafluorocyclobutane, are prepared by the thermal dimerization of tetrafluoroethylene and other unsaturated fluorocarbons. In such preparations, various saturated halohydrocarbon and unsaturated halocarbon by-products are formed. Such by-products and unconverted reactants are present in the saturated fluorocarbons as impurities or contaminants. While the saturated by-products are essentially nontoxic, their presence in substantial amounts may lead to excessive ionic fluorine development when stored in the presence of food products or otherwise exposed to moisture. The unsaturated fluorocarbon by-products and unconverted reactants are toxic and may also contribute ionic fluorine upon hydrolysis. Neither the saturated nor the unsaturated by-products of fluorocarbon manufacture can be sufficiently reduced by distillation or other physical methods to the low concentrations that may be desired or necessary for many uses. Among the objectionable unsaturated impurities that are frequently present in such unrefined saturated fluorocarbons are perfluoroolefins, such as tetrafluoroethylene ($C_2$), hexafluoropropene ($C_3$), and octafluoroisobutylene ($C_4$).

Many of the saturated fluorocarbons are prepared by the pyrolysis of highly fluorinated compounds which also contain chlorine, or hydrogen, or both. When saturated fluorocarbons are made by such processes, they also contain, in addition to perfluoroolefins, saturated and unsaturated highly fluorinated compounds which contain chlorine, hydrogen, or both chlorine and hydrogen. Such impurities containing chlorine or hydrogen are unstable and reactive, and particularly are subject to hydrolysis whereby they release fluoride ion.

Representative objectoinable saturated impurities that are frequently present in saturated fluorocarbons which have been refined solely by distillation are 1,2-dichlorotetrafluoroethane, 1,1,2-trifluoroethane, 1,1,1,2-tetrafluoroethane, 2-chloro-1,1,1,2-tetrafluoroethane, 2-chloro-1,1,-2,2-tetrafluoroethane, pentafluoroethane, 1,1-difluoroethane, and corresponding fluorinated propanes and butanes.

One indication of the presence of the objectionable impurities and the harmful effects thereof, when present as impurities in the saturated perfluorocarbons, is shown by exposing mice to an atmosphere containing the impure saturated fluorocarbons. For example, when mice were exposed for a short time to air containing small amounts of unrefined octafluorocyclobutane containing unsaturated and like impurities produced as by-products in its preparation, they succumbed to severe hemorrhagic pulmonary edema. After purification of the octafluorocyclobutane by treatment in accord with the present invention, no ill effects on mice were observed during exposure to air containing much higher concentrations of the octafluorocyclobutane. A rapid and reliable method for the determination of the objectionable $C_3$ and $C_4$ unsaturated fluorocarbon impurities and their concentration in a saturated fluorocarbon, and thus the suitability of such saturated fluorocarbon for use free of toxic hazards, is a color-forming test and colorimetric analysis which comprises bubbling the impure saturated fluorocarbon through cold methanol, treating the resulting methanol solution of the impurities with pyridine and piperidine to develop color, and then determining the percent of light transmission of the methanol solution. The degree of contamination of a saturated fluorocarbon by such objectionable impurities and the effect of a given treatment for the purification thereof may also be determined by mass spectroscopy and by high resolution gas chromatography.

Such impurities, particularly the unsaturated compounds, are toxic and constitute a hazard in the handling and use of saturated fluorocarbons containing them, particularly when it is desired to use a saturated fluorocarbon as the propellant for a food formulation. For use as a food propellant, it is essential that the saturated fluorocarbon be safe for human consumption and hence that it be substantially free from any toxic impurities and any impurities which are hydrolytically unstable. That is, the saturated fluorocarbon should contain less than one part per million (p.p.m.) of the toxic impurities, and not over 5 parts per million of hydrolyzable impurities so that, when the purified saturated fluorocarbon is in contact with water, not more than one part per million of fluoride ion will be formed, say, over a period of a year. Such amount of fluoride ion would not be injurious in foods and would not affect the electrical properties of the saturated fluorocarbons in their use as dielectrics or render them objectionally corrosive. Prior to the present invention, the removal of such impurities from the saturated fluorocarbons to the extent necessary to provide products which are reasonably free of toxic hazards, particularly products which are sufficiently safe for use with foodstuffs, has been difficult and not commercially practicable. Some prior processes fail to yield products of the required purity. Other prior processes, are inefficient and require impractically long and costly procedures.

It is an object of this invention to produce a saturated fluorocarbon that is free from harmful amounts of impurities of the character of those obtained as by-products in the manufacture of the saturated fluorocarbon. Another object is to provide an effective chemical process for decreasing the impurities occurring in unrefined saturated fluorocarbons. A further object is to provide a grade of a saturated fluorocarbon, such as octafluorocyclobutane, that is suitable for use as a propellant for food formulations. Other objects are to advance the art. Still other objects will appear hereinafter.

The above and other objects may be accomplished in accord with this invention which comprises the process for decreasing the impurities in a saturated fluorocarbon of 2 to 6 carbon atoms in which the impurities are highly fluorinated organic compounds obtained as by-products or as unconverted reactants in the preparation of the saturated fluorocarbon and include at least one highly fluorinated unsaturated organic compound, which process comprises intimately contacting the impure saturated fluorocarbon with at least one member of the group consisting of piperidine, pyrrolidine and a mixture of from about 99 to about 10 parts by weight of pyridine and from about 1 to about 90 parts by weight of at least one member of the group consisting of piperidine and pyrrolidine at a temperature of from about 0° C. to about 80° C., and separating the purified saturated fluorocarbon from the reaction mixture.

Piperidine, pyrrolidine, and mixtures of piperidine and pyrrolidine by themselves (without pyridine) are effective to remove the objectionable impurities from the saturated fluorocarbons. However, the combination of piperidine or pyrrolidine or mixtures thereof and pyridine is especially effective in decreasing the objectionable impurities contained in the saturated fluorocarbons to harmless proportions and essentially to a state of non-existence. The mixture of piperidine or pyrrolidine and pyridine is much more effective for this purpose than other amines such as ammonia, aniline, diethylamine, and the like. It is more effective than piperidine or pyrrolidine alone or in solution with other solvents such as ethers, dimethylformamide and the like.

The saturated fluorocarbons, which are to be treated and purified in accord with this invention, are those which contain from 2 to 6 carbon atoms and include the acyclic (open chain) and alicyclic (containing a cyclic carbon ring) compounds. The term "fluorocarbon" is used in its commonly understood sense to mean a compound which consists of carbon and fluorine, i.e., contains no other elements. Also the term "saturated" is employed in the strict sense to mean that adjacent carbons of the compounds are joined solely by single bonds, that is, the compounds do not contain any multiple carbon-carbon bonds. Representative saturated fluorocarbons are: hexafluoroethane, octafluoropropane, decafluorobutane, dodecafluoropentane, tetradecafluorohexane, hexafluorocyclopropane, octafluorocyclobutane, trifluoromethylheptafluorocyclobutane, bis-(trifluoromethyl)hexafluorocyclobutane, pentafluoroethyl-heptafluorocyclobutane, decafluorocyclopheutane and dodecafluorocyclohexane. The impure saturated fluorocarbons are those in which the impurities are highly fluorinated organic compounds obtained as by-products or as unconverted reactants in their preparation and include at least one highly fluorinated unsaturated organic compound. They may have been prepared by any known process, such as dimerization, pyrolysis or fluorination processes.

In accord with the process of this invention, the impure saturated fluorocarbons are purified by contacting them with piperidine, pyrrolidine, a mixture of piperidine and pyrrolidine, or preferably with a solution of piperidine, of pyrrolidine, or of a mixture of piperidine and pyrrolidine in pyridine. Such solution should contain from about 99 parts to about 10 parts by weight of the pyridine and the other 1 to 90 parts by weight of piperidine, pyrrolidine, or both. Usually, it will be preferred that the pyridine constitute from about 60 parts to about 40 parts by weight of the solution and the other amine constitute the other 40 to 60 parts. The most preferred mixture is one composed of 50 parts by weight of pyridine and 50 parts by weight of the other amine or amines.

To the pyridine solution may be added about 1% to about 5% by weight of an alkali metal hydroxide, such as sodium hydroxide or potassium hydroxide, and the amine mixture is preferably used containing the alkali metal hydroxide. The presence of the inorganic base promotes the reaction between the amines and the objectionable impurities and makes possible a more efficient purification process; that is, the purification is more readily and completely accomplished. The sodium or potassium hydroxide may be added to the solution of amines as solid material or as a 10% to 25% water solution.

Treatment of the saturated fluorocarbon to be purified with the amine reagents of this invention may be carried out in a continuous gas-liquid phase reactor or in a batch liquid-liquid phase reactor. In a continuous gas-liquid phase reactor, the impure saturated fluorocarbon forms the gas phase while the amine reagent composes the liquid phase. The gas is bubbled through a packed column, bubble plate column, tower, or similar device arranged and adapted for scrubbing the gas with the amine reagent or allowing intimate contact between the gas and the liquid. The column or scrubber may be recharged with fresh amine reagent from time to time, when necessary, or the reagent may be permitted to flow continuously countercurrent to the gas stream and be replenished without interrupting the operation.

To avoid excessive vaporization of the amines during the passage of the gas through the amine reagent at essentially atmospheric pressure, the usual practical working temperature range for the continuous gas-liquid phase treatment is about 0° C. to about 60° C. The preferred temperature for treating the $C_2$ to $C_4$ saturated fluorocarbons is about 20° C. to about 25° C., and for treating the $C_5$ and $C_6$ saturated fluorocarbons temperatures just above the respective boiling point of the compound being treated should prevail.

When the gas emerges from the continuous gas-liquid phase reactor, it is convenient and economical to pass it directly through an acid washing or scrubbing system to remove any amine the fluorocarbon gas may contain. From the acid scrubber, the gas may be passed through a drying tube containing a drying agent such as silica gel, anhydrous calcium sulfate and the like, and then be condensed in preparation for a final fractional distillation.

In the liquid-liquid phase reactor that works with single batches of material at a time, the impure saturated fluorocarbon and the amine reagent are kept mixed by agitation in a closed vessel, such as an autoclave. Contact of the liquids is maintained for from about one hour to about 48 hours at temperatures from about 0° C. to about 80° C. The preferred temperature is from about 20° C. to about 25° C. For a saturated fluorocarbon having a boiling point at atmospheric pressure lower than the selected operating temperature, the reaction vessel must be gas-tight and capable of withstanding the generated pressure. The relative amounts of the saturated fluorocarbon and amine reagent that should be employed in a batch treatment depend upon the amount of impurities to be removed from the saturated fluorocarbon. The reactor charge should comprise at least one part of piperidine for each part of fluoroolefine and other impurities previously determined to be present in the saturated fluorocarbon to be purified. At least 50% to 100% excess of this amount of such amine is usually employed. Larger amounts of such amine may be present without adverse effect.

When the reaction in the liquid-liquid phase reactor is completed, the saturated fluorocarbon is removed from the amine reagent by some suitable means, such as flash evaporation. The effluent gas is then conveniently washed with aqueous acid solution, dried, condensed, and distilled in the same way that the gas from the gas-liquid phase reactor is handled.

The acid washing of a saturated fluorocarbon, after contact with the amine reagent, is best done with about 10% to about 20% aqueous phosphoric acid or sulfuric acid solution in a suitable scrubber or mixing vessel to remove, at a temperature at which the saturated fluorocarbon exists as a gas, any piperidine, pyrrolidine, pyridine or mixtures thereof.

The colorimetric anaylsis for unsaturated fluorocarbons consisted of bubbling a 25 gm. sample of the saturated fluorocarbon at a rate of 0.4 cu. ft. per hour through a 40 ml. impinger flask containing 15 ml. of methanol maintained at −5° C. To the methanol, which now contained the unsaturated fluorocarbons removed from the saturated fluorocarbon, was first added 5 ml.

of pyridine and then 5 ml. of piperidine. The mixture was agitated for 15 to 30 seconds and allowed to stand 60 minutes to develop color. The volume was then adjusted to 25 ml. with methanol. The percent transmission of light in 5.0-cm. cells at 420 mu was then determined colorimetrically, and the quantity of unsaturated fluorocarbons present, corresponding to the percent transmission, was read from a calibration curve.

The presence of saturated compounds containing chlorine, hydrogen, or both chlorine and hydrogen in addition to fluorine may be detected by exposing the saturated fluorocarbon containing them to water for extended periods of time and analyzing the water for fluoride ion. A more rapid and a highly sensitive laboratory procedure is to make a quantitative measure of trace amounts of these impurities by high resolution gas chromatography. The procedure employed in the examples below is described by Bennett et al. (Analyt. Chem. 30, 898 (1958), using a 30-foot column of Chromosorb (Johns-Manville) bearing dibutyl maleate as a liquid absorbent. Trace amounts of tetrafluoroethylene also are determined by this procedure. The $C_3$ and $C_4$ unsaturated fluoroolefins likewise are determined in this way and by the colorimetric procedure already given.

In order to more clearly illustrate this invention, preferred modes of carrying it into effect and the advantageous results obtained thereby, the following examples are given in which the parts and proportions are by weight except where specifically indicated otherwise.

EXAMPLE 1

An apparatus was assembled which consisted of five test tubes each of 40 ml. capacity and each having a two-hole rubber stopper with a gas impinger that extended to the bottom of the tube and a short glass tube. The test tubes were connected in series with rubber tubing so that a gas which entered the impinger of the first test tube would pass out of the test tube through the short glass tube and into the gas impinger of the second test tube, and so on until it emerged finally from the fifth test tube. The first four test tubes were each charged with 30 ml. of a solution of 16.7% by weight of pyrrolidine in pyridine. The last tube was charged with 30 ml. of a 10% water solution of sulfuric acid. An unrefined sample of octafluoro-cyclobutane was then passed through the apparatus at room temperature and atmospheric pressure at a rate of 17.3 g. per hour for a period of two hours. An analysis of the scrubbed gas by mass spectroscopy revealed an essentially complete removal by contact with the pyrrolidine-pyridine solution of the unsaturated perfluoro compounds contained in the octafluorocyclobutane taken for purification. The results are:

|  | Composition of octafluorocyclobutane in percent by vol. | | | |
|---|---|---|---|---|
|  | Octafluoro-cyclobutane | Tetrafluoroethylene | Hexafluoropropene | Octafluoroisobutylene |
| Before treatment | 91.5 | 5.6 | 1.9 | 1.0 |
| After treatment | 100.0 | ¹ 0.0 | ¹ 0.0 | ¹ 0.0 |

¹ None of this compound detected.

The impure octafluorocyclobutane also contained as impurities small quantities of saturated halohydrocarbons which were not detected by mass spectroscopy, but which were detected by high resolution gas chromatography as shown in Example 5, hereinafter.

The above procedure was repeated except that the rate of flow of octafluorocyclobutane gas was 30 g. per hour. The scrubbed gas was collected and analyzed colorimetrically and found to contain 0.23 p.p.m. of $C_3$ and $C_4$ unsaturated fluorocarbons.

The above first procedure was again repeated, except that the scrubbing solution in the first four test tubes comprised 33.3% by weight of piperidine in pyridine and a different sample of octafluorocyclobutane was used. Analysis of the scrubbed gas showed that 5.5% tetrafluoroethylene, 1.1% hexafluoropropene, and 0.2% octafluoroisobutylene, present in the untreated octafluorocyclobutane, were reduced to quantities undetectable by means spectroscopy. By the colorimetric analysis described above, the scrubbed gas contained 0.2 p.p.m. of $C_3$ and $C_4$ unsaturated fluorocarbons.

EXAMPLE 1A

*Diethylamine and ethanolamine as reactants in purification of octafluorocyclobutane*

By the procedure of Example 1, unrefined octafluorocyclobutane was bubbled through the first four scrubbers containing ethanolamine or a 70% by weight aqueous solution of diethylamine, and through a fifth tube containing 10% sulfuric acid. The rate of gas flow was 0.3 to 0.5 g./min. at 25° C. About 30 grams of material was collected, and portions were analyzed by mass spectroscopy with the results given below. The "A" sample in each case is the unrefined fluorocarbon before treatment, and the "B" sample is the amine-treated material.

| Vol. percent | Octafluorocyclobutane | Tetrafluoroethylene | Hexafluoropropene | Octafluoroisobutylene |
|---|---|---|---|---|
| Ethanolamine: | | | | |
| A | 80.9 | 16.4 | 1.9 | 0.8 |
| B | 87.9 | 10.6 | 0.9 | 0.6 |
| Diethylamine, 70% water soln.: | | | | |
| A | 82.1 | 6.9 | 4.6 | 6.4 |
| B | 86.8 | 6.6 | 0.1 | 6.5 |

These amines reduce the fluoroolefinic impurities to varying degrees and do not at all begin to exhibit the effectiveness of the piperidine-pyridine solution of Example 1.

EXAMPLE 2

A scrubbing apparatus, consisting of a glass column 2 inches in diameter by 6 feet in length and packed with ¼-inch ceramic Berl saddles, was assembled. Down through the column at room temperature flowed a solution of mixed amines (set forth in Table 1) which was kept circulated from a reservoir at the bottom of the column while unrefined octafluorocyclobutane gas entered the column at the base and passed up through the amine solution. From the top of the column, the amine-scrubbed gas was passed in turn through a scrubber containing 10% aqueous phosphoric acid, a silica gel dryer, and finally to a cold receiver. The feed rate of the gas through the system was varied from 1.8 to 3.4 lbs. per hour. The untreated octafluorocyclobutane was about 98% pure. It contained about 2% tetrafluoroethylene and hexafluoropropene, 0.075% octafluoroisobutylene, 0.15% other $C_4$ unsaturates, and about 0.3% saturated impurities. The much reduced concentrations of $C_3$ and $C_4$ unsaturated fluorocarbons present after treatment of the octafluorocyclobutane revealed by the colorimetric analysis described heretofore are shown in Table 1.

TABLE 1

| Feed rate of octafluorocyclobutane, lbs./hr¹ | Absorbent solution for unsaturated compounds | Composition of treated mat'l.— $C_3$ and $C_4$ unsaturated compounds, p.p.m. |
|---|---|---|
| 1.8 | 50 Pyrrolidine—50 pyridine | <1.0 |
| 3.4 | do | ca. 1.0 |
| 2.9 | 50 Piperidine—50 pyridine | <1.0 |
| 2.9 ¹ | do | <0.15 |

¹ Octafluorocyclobutane repassed through column.

The reduction of the unsaturated impurities by a second pass of the octafluorocyclobutane through the column, or by the indicated use of a column twice as long as that employed, is carried to extremely low concentrations as shown by the analytical results given in the fifth horizontal row of the table.

A three-pound sample of the unrefined octafluorocyclobutane was treated with a 50 piperidine-50 pyridine solution in the countercurrent gas-liquid phase scrubber described above. After fractional distillation of this sample in a low temperature laboratory still having a fractionation efficiency of about 15 plates, a middle cut amounting to 70% of the whole sample was obtained that contained 20 p.p.m. of a mixture of dichlorodifluoromethane, octafluoropropane and decafluorobutane as the only impurities. By high resolution gas chromatography and colorimetric analysis, this material was found to contain less than 0.1 p.p.m. of $C_3$ and $C_4$ fluoro unsaturates. No trace of amines could be detected in the product.

EXAMPLE 3

*Piperidine alone as a reactant for the fluoroolefinic impurities in octafluorocyclobutane*

Using the same impure octafluorocyclobutane and the procedure of Example 2 except that piperidine alone was circulated through the column with an octafluorocyclobutane gas flow of 3.6 lbs./hr., the tetrafluoroethylene content was reduced to 0.2% while with a 50/50 piperidine-pyridine solution under the same conditions except for a gas feed rate of 2.9 lbs./hr., the tetrafluoroethylene content was reduced to 0.03%. The slower feed rate would allow a greater contact or reaction time but the much greater purifying effect than can be accounted for by the slower feed rate is attributed to the synergistic effect of the pyridine with the piperidine.

EXAMPLE 4

A two-gallon stainless steel autoclave was charged with 5 lbs. of piperidine and 5 lbs. of pyridine and cooled to −4° C. To the autoclave was then added 16.2 lbs. of unrefined (94% pure) liquid octafluorocyclobutane, and the autoclave was closed so that it was gas tight. The mixture was agitated while the autoclave and its contents were heated to 20° C. and maintained at this temperature for 48 hours. During this time, samples of octafluorocyclobutane gas were withdrawn, scrubbed with 10% aqueous phosphoric acid solution, dried, and analyzed by high resolution gas chromatography and the colorimetric procedure for toxic impurities as represented by tetrafluoroethylene and $C_3$ and $C_4$ unsaturated compounds. The results are recorded below:

| Reaction Time in Hrs. | Olefin Content of Octafluorocyclobutane | |
|---|---|---|
| | Tetrafluoroethylene, p.p.m. | $C_3$ and $C_4$ Compounds, p.p.m. |
| 2 | 18 | <0.1 |
| 4 | 9 | <0.1 |
| 28 | <2 | <0.1 |
| 48 | <2 | <0.1 |

EXAMPLE 5

By the procedure given in Example 4 with stirring the fluorocarbon-amine mixture for 50 hrs. at about 20° C., flash evaporating the fluorocarbon, scrubbing the gas with 10% phosphoric acid solution, drying, condensing the gas and finally fractionally distilling the product, the purification revealed by the following high resolution gas chromatography was effected.

*Analysis of octafluorocyclobutane*

| | Unrefined Starting Material | | Purified Product | |
|---|---|---|---|---|
| | Vol. Percent | P.p.m. | Vol. Percent | P.p.m. |
| Octafluorocyclobutane | 95.60 | | 100.00 | |
| Trifluoromethylheptafluorocyclobutane | 0.51 | | | <1 |
| Hexafluoropropene | 3.40 | | | <1 |
| Tetrafluoroethylene | .43 | | | <1 |
| Octafluoroisobutylene | | 597 | | <1 |
| 2-Chloro-1,1,1,2-tetrafluoroethane | | 93 | | <1 |
| 1,1,1,2-Tetrafluoroethane | | 88 | | <1 |
| Pentafluoroethane | | 83 | | <1 |
| 2-Chloro-1,1,2,2-tetrafluoroethane | | 45 | | <1 |
| 1,2-Dichlorotetrafluoroethane | | 22 | | <1 |
| 1,1,2-Trifluoroethane | | 13 | | <1 |

The piperidine-pyridine reactant effectively decreases both the unsaturated fluoroolefin and the saturated halohydrocarbon impurities to extremely low concentrations.

EXAMPLE 6

Two 500 ml. steel cylinders were charged as follows:

Cylinder A was charged with 140 g. of a solution of piperidine and pyridine taken in the weight ratio of 50/50 and with 350 g. of impure octafluorocyclobutane containing 6% toxic impurities. Cylinder B was charged with the same amounts of the same materials and in addition with 15 ml. of a 15% aqueous sodium hydroxide solution. The cylinders were rotated on a shaft turning at about 50 r.p.m. at room temperature. After 4 hours and 24 hours, samples of the fluorocarbon were withdrawn, scrubbed with acid, dried, and analyzed for their content of tetrafluoroethylene and $C_3$ and $C_4$ fluoroolefins by gas chromatography and colorimetry. The results are:

| | Time, Hrs. | Tetrafluoroethylene content, p.p.m. | Content of $C_3$ and $C_4$ olefins, p.p.m. |
|---|---|---|---|
| Sample from Cylinder A | 4 | >14 | <0.1 |
| | 24 | 13.4 | <0.1 |
| Sample from Cylinder B | 4 | 9 | <0.1 |
| | 24 | 4.6 | <0.02 |

The presence of sodium hydroxide in the piperidine-pyridine solution promotes the reaction between the mixed amines and the toxic impurities as shown by the lower content of impurities in the fluorocarbon from Cylinder B to which the sodium hydroxide was added.

EXAMPLE 7

Various pure perfluoroalkanes were purposely contaminated with 0.33 to 1.0 mole percent of hexafluoropropene, brought into liquid-liquid contact with a 50–50 piperidine-pyridine mixture, and analyzed for the hexafluoropropene content. The simulated impure perfluoroalkane was charged into a 120 ml. steel cylinder to which had been added 15 g. of the amine mixture. The cylinder was then agitated for 1 hour at room temperature. The perfluoroalkane was flash evaporated from the mixture, passed through a 20% aqueous phosphoric acid solution, dried, and analyzed by gas chromatography. The perfluoroalkanes treated in this way, together with the amounts taken for purification, and the hexafluoropropene content of the purified materials were:

| Perfluoroalkane | Hexafluoropropene added, mole percent | Amt. of sample taken for contact with amine mixture, g. | Hexafluoropropene content of treated material |
|---|---|---|---|
| Hexafluoroethane | 0.5 | 25 | [1] nil |
| Octafluoropropane | 0.33 | 33 | nil |
| Decafluorobutane | 1.0 | 15 | nil |
| Tetradecafluorohexane | 1.0 | 20 | nil |

[1] 10 p.p.m. was the limit of detectability by the particular gas chromatographic apparatus used.

Clearly, a marked reduction in the concentration of the unsaturated fluoro compound in the different perfluoroalkanes is effected by the liquid-liquid contact of the impure material with a mixture of piperidine and pyridine. Similar results are obtained using a mixture of 50 parts of pyrrolidine and 50 parts of pyridine.

It will be understood that the preceding examples have been given for illustrative purposes solely and that this invention is not limited to the specific embodiments described therein. On the other hand, it will be readily apparent to those skilled in the art, that within the limitations set forth in the general description, many variations and modifications can be made therein, particularly in the proportions, conditions, equipment and techniques employed without departing from the spirit or scope of this invention.

It will be apparent from the foregoing description that this invention provides a novel and very effective process for purifying or refining saturated fluorocarbons. The process is simple and easy to operate and quickly and effectively decreases the objectionable impurities to a safe low level of concentration. Thereby, the saturated fluorocarbons are obtained in a pure or substantially pure state whereby they can be used for desired purposes and handled without undue hazard to those employing and handling them. Particularly, the process produces low boiling saturated fluorocarbons, boiling below atmospheric temperatures, which are purified to such an extent that they are safe for use as propellants for food formulations. Accordingly, it will be apparent that this invention constitutes a valuable contribution to and advance in the art.

The embodiments of the invention in which an exclusive property or privilege is claimed are defined as follows:

1. The process for purifying an impure saturated perfluorocarbon of 2 to 6 carbon atoms in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure saturated perfluorocarbon with at least one member of the group consisting of piperidine, pyrrolidine and a mixture of from about 99 to about 10 parts by weight of pyridine and from about 1 to about 90 parts by weight of at least one member of the group consisting of piperidine and pyrrolidine at a temperature of from about 0° C. to about 80° C., and separating the purified saturated perfluorocarbon from the reaction mixture.

2. The process for purifying an impure saturated perfluorocarbon of 2 to 6 carbon atoms in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure saturated perfluorocarbon with a mixture of from about 60 to about 40 parts by weight of pyridine and from about 40 to about 60 parts by weight of at least one member of the group consisting of piperidine and pyrrolidine at a temperature of from about 0° C. to about 80° C., and separating the purified saturated perfluorocarbon from the reaction mixture.

3. The process for purifying an impure saturated perfluorocarbon of 2 to 6 carbon atoms in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure saturated perfluorocarbon with a mixture of from about 99 to about 10 parts by weight of pyridine and from about 1 to about 90 parts by weight of at least one member of the group consisting of piperidine and pyrrolidine and from about 1 to about 5 parts by weight of an alkali metal hydroxide at a temperature of from about 0° C. to about 80° C., and separating the purified saturated perfluorocarbon from the reaction mixture.

4. The process for purifying an impure saturated perfluorocarbon of 2 to 6 carbon atoms in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure saturated perfluorocarbon in the gaseous phase with a liquid mixture of from about 99 to about 10 parts by weight of pyridine and from about 1 to about 90 parts by weight of at least one member of the group consisting of piperidine and pyrrolidine at a temperature of from about 0° C. to about 80° C., and separating the purified saturated perfluorocarbon from the reaction mixture.

5. The process for purifying an impure saturated perfluorocarbon of 2 to 6 carbon atoms in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure saturated perfluorocarbon in the gaseous phase with a liquid mixture of from about 99 to about 10 parts by weight of pyridine and from about 1 to about 90 parts by weight of at least one member of the group consisting of piperidine and pyrrolidine at a temperature of from about 0° C. to about 60° C., and separating the purified saturated perfluorocarbon from the reaction mixture.

6. The process for purifying an impure saturated perfluorocarbon of 2 to 6 carbon atoms in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure saturated perfluorocarbon in the gaseous phase with a liquid mixture of from about 99 to about 10 parts by weight of pyridine and from about 1 to about 90 parts by weight of at least one member of the group consisting of piperidine and pyrrolidine at a temperature of from about 20° C. to about 25° C., and separating the purified saturated perfluorocarbon from the reaction mixture.

7. The process for purifying an impure saturated perfluorocarbon of 2 to 6 carbon atoms in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure saturated perfluorocarbon in the liquid phase with a liquid mixture of from about 99 to about 10 parts by weight of pyridine and from about 1 to about 90 parts by weight of at least one member of the group consisting of piperidine and pyrrolidine at a temperature of from about 0° C. to about 80° C., and separating the purified saturated perfluorocarbon from the reaction mixture.

8. The process for purifying an impure saturated perfluorocarbon of 2 to 4 carbon atoms in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting under pressure the impure saturated perfluorocarbon in the liquid phase with a liquid mixture of from about 99 to about 10 parts by weight of pyridine and from about 1 to about 90 parts by weight of at least one member of the group consisting of piperidine and pyrrolidine at a temperature of from about 0° C. to about 80° C. and separating the purified saturated perfluorocarbon from the reaction mixture.

9. The process for purifying an impure saturated perfluorocarbon of 2 to 4 carbon atoms in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting under pressure the impure saturated perfluorocarbon in the liquid phase with a liquid mixture of from about 99 to about 10 parts by weight of pyridine and from about 1 to about 90 parts by weight of at least one member of the group consisting of piperidine and pyrrolidine at a temperature of from about 0° C. to about 25° C., and separating the purified saturated perfluorocarbon from the reaction mixture.

10. The process for purifying impure octafluorocyclobutane in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure octafluorocyclobutane in the gaseous phase with a mixture of from about 99 to about 10 parts by weight of pyridine and from about 1 to about 90 parts by weight of at least one member of the group consisting of piperidine and pyrrolidine at a temperature of from about 0° C. to about 60° C., and separating the purified octafluorocyclobutane from the reaction mixture.

11. The process for purifying impure octafluorocyclobutane in which the impurities consist essentially of unsaturated highly fluorinated compounds of the group consisting of perfluoroolefins and unsaturated halohydrocarbons which contain at least one member of the group consisting of chlorine and hydrogen and which impurities include at least one unsaturated highly fluorinated perhalocarbon, which process comprises intimately contacting the impure octafluorocyclobutane in the gaseous phase with a mixture of from about 99 to about 10 parts by weight of pyridine and from about 1 to about 90 parts by weight of at least one member of the group consisting of piperidine and pyrrolidine at a temperature of from about 20° C. to about 25° C., and separating the purified octafluorocyclobutane from the reaction mixture.

12. The process for purifying impure octafluorocyclobutane in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure octafluorocyclobutane with a mixture of from about 99 to about 10 parts by weight of pyridine and from about 1 to about 90 parts by weight of piperidine at a temperature of from about 0° C. to about 60° C., and separating the purified octafluorocyclobutane from the reaction mixture.

13. The process for purifying impure octafluorocyclobutane in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting under pressure the impure octafluorocyclobutane in the liquid phase with a liquid mixture of from about 99 to about 10 parts by weight of pyridine and from about 1 to about 90 parts by weight of at least one member of the group consisting of piperidine and pyrrolidine at a temperature of from about 0° C. to about 60° C., and separating the purified octafluorocyclobutane from the reaction mixture.

14. The process for purifying impure octafluorocyclobutane in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting under pressure the impure octafluorocyclobutane in the liquid phase with a liquid mixture of from about 99 to about 10 parts by weight of pyridine and from about 1 to about 90 parts by weight of at least one member of the group consisting of piperidine and pyrrolidine at a temperature of from about 20° C. to about 25° C., and separating the purified octafluorocyclobutane from the reaction mixture.

15. The process for purifying impure octafluorocyclobutane in which the impurities consist essentially of unsaturated highly fluorinated compounds of the group consisting of perfluoroolefins and unsaturated halohydrocarbons which contain at least one member of the group consisting of chlorine and hydrogen, and which impurities include at least one unsaturated highly fluorinated perhalocarbon, which process comprises intimately contacting the impure octafluorocyclobutane with a liquid mixture of from about 99 to about 10 parts by weight of pyridine and from about 1 to about 90 parts by weight of piperidine at a temperature of from about 0° C. to about 60° C., and separating the purified octafluorocyclobutane from the reaction mixture.

References Cited in the file of this patent

UNITED STATES PATENTS 2,691,052    Cines _____ Oct. 5, 1954
2,738,371    Parmelee _____ Mar. 13, 1956